(12) United States Patent
Zhang et al.

(10) Patent No.: US 8,195,775 B2
(45) Date of Patent: Jun. 5, 2012

(54) ENHANCED METHOD AND APPARATUS FOR REDUCING CONGESTION IN DHCP NETWORK SYSTEM

(75) Inventors: Zhi Gang Zhang, Beijing (CN); Kui Gao, Wilmette, IL (US); Jian Song Li, Beijing (CN)

(73) Assignee: Thomson Licensing (FR)

( * ) Notice: Subject to any disclaimer, the term of this patent is extended or adjusted under 35 U.S.C. 154(b) by 0 days.

(21) Appl. No.: 12/450,684

(22) PCT Filed: Apr. 6, 2007

(86) PCT No.: PCT/CN2007/001113
§ 371 (c)(1),
(2), (4) Date: Mar. 11, 2010

(87) PCT Pub. No.: WO2008/122146
PCT Pub. Date: Oct. 16, 2008

(65) Prior Publication Data
US 2010/0198910 A1 Aug. 5, 2010

(51) Int. Cl.
*G06F 15/16* (2006.01)
(52) U.S. Cl. .............. 709/220; 370/351; 370/235
(58) Field of Classification Search .............. 709/220, 709/229; 370/235
See application file for complete search history.

(56) References Cited

U.S. PATENT DOCUMENTS

| 5,884,024 | A | * | 3/1999 | Lim et al. ................... 726/3 |
| 6,073,178 | A | * | 6/2000 | Wong et al. ................ 709/229 |
| 6,138,017 | A | * | 10/2000 | Price et al. ................. 455/433 |
| 7,051,089 | B1 | | 5/2006 | Johnson et al. |
| 7,912,954 | B1 | * | 3/2011 | Oesterreicher et al. ....... 709/226 |
| 2002/0161868 | A1 | * | 10/2002 | Paul et al. .................. 709/221 |
| 2003/0126262 | A1 | * | 7/2003 | Yoshida et al. ............. 709/226 |
| 2003/0172282 | A1 | * | 9/2003 | Jiang ......................... 713/184 |
| 2003/0174648 | A1 | * | 9/2003 | Wang et al. ................ 370/235 |
| 2005/0068969 | A1 | | 3/2005 | Park et al. |
| 2006/0130064 | A1 | * | 6/2006 | Srivastava .................. 718/102 |
| 2006/0233155 | A1 | * | 10/2006 | Srivastava .................. 370/351 |
| 2008/0098084 | A1 | * | 4/2008 | Volz et al. .................. 709/217 |

FOREIGN PATENT DOCUMENTS

CN 1601988 3/2005

OTHER PUBLICATIONS

Search Report Dated Dec. 20, 2007.

* cited by examiner

*Primary Examiner* — Wing Chan
*Assistant Examiner* — Tesfay Yohannes
(74) *Attorney, Agent, or Firm* — Jack Schwartz and Associates PLLC

(57) ABSTRACT

An enhanced method and apparatus for reducing congestion in dynamic host configuration protocol network system are provided. The congestion reduction method comprises steps of receiving a DHCP request from a DHCP client; and stopping responding to a certain number of DHCPDISCOVER message. And the dynamic host configuration protocol server comprises at least one distributed server, at which the contents of the network service provider server are backed up.

7 Claims, 6 Drawing Sheets

| Byte0 | Byte1 | Byte2 | Byte3 |
|---|---|---|---|
| op(1) | htype(1) | hlen(1) | hopes(1) |
| xid(4) ||||
| secs(2) || flags(2) ||
| ciaddr(4) ||||
| yiaddr(4) ||||
| siaddr(4) ||||
| giaddr(4) ||||
| chaddr(16) ||||
| sname(64) ||||
| file(128) ||||
| options(variable) ||||

(PRIOR ART)

FIG.1

ENHANCED METHOD AND APPARATUS FOR REDUCING CONGESTION IN DHCP NETWORK SYSTEM

This application claims the benefit, under 35 U.S.C. §365 of International Application PCT/CN2007/001113, filed Apr. 6, 2007, which was published in accordance with PCT Article 21(2) on Oct. 16, 2008 in English.

FIELD OF THE INVENTION

The invention relates to communication network services, and more particularly to an enhanced method and apparatus for reducing congestion in DHCP network system.

BACKGROUND OF THE INVENTION

When network access devices (e.g. workstations, Personal Computers) connect to a network service provider on a network to exchange data, they need an IP address. Dynamic Host Configuration Protocol (DHCP) is a protocol configuring IP addresses to network access devices. For example, when a computer is powered on, firstly it uses DHCP to obtain an IP address and some necessary information, such as Domain Name System (DNS) information, routing information, etc. The servers that use DHCP to configure the IP addresses are known as DHCP servers and the network access devices are DHCP clients.

FIG. 1 shows an exemplary format of a conventional DHCP message. As shown in FIG. 1, the DHCP message comprises a ciaddr field, xid field, yiaddr field, siaddr field, giaddr field, chaddr field, and an option field. Usually, there are eight types of DHCP messages altogether: DHCPDISCOVER, DHCPOFFER, DHCPREQUEST, DHCPACK, DHCPNAK, DHCPRELEASE, DHCPDECLINE, and DHCPINFORM. And the type of each DHCP message is encoded within the option field.

FIG. 2 shows how IP address allocation is performed between DHCP servers and a DHCP client. As shown in FIG. 2, the process is carried out by several DHCP messages over several stages:

Discover: the DHCP client broadcasts a DHCPDISCOVER message on its local physical network to discover a DHCP server.

Offer: this is a stage where DHCP servers offer IP addresses. After receiving the DHCPDISCOVER message sent by the DHCP client, each DHCP server on the network responds with a DHCPOFFER message which contains an available IP address in the 'yiaddr' field of the message packet and other configuration information. The available IP address is selected from the pool of addresses available at that time.

Request: the DHCP client chooses one DHCPOFFER, usually the first DHCPOFFER message it receives, and broadcasts a DHCPREQUEST message which contains the IP address from a DHCP server, indicating that the DHCP server providing the IP address has been selected.

ACKnowledgement: the selected DHCP server responds with a DHCPACK message containing the IP address and the configuration parameters for the requesting client and informs the requesting client of the availability of the IP address.

When the DHCP client receives the DHCP ACK message, it binds the allocated IP address to its network card and uses this address to exchange packets with the network service provider on the network.

Transmission of television over an Internet Protocol network ('IPTV') has developed in recent years and is a competitive application compared to traditional TV transmission systems. IPTV uses an IP based distribution platform to deliver digital services to home network end devices. Such kind of home network end devices can include set top boxes, etc.

FIG. 3 is the architecture of a conventional IPTV network provisioning system 30. Such a system 30 usually comprises one Network Service Provider Server 31 which is in charge of network provisioning, a plurality of Home Network End Devices (HNEDs) 33 (DHCP clients), one or more DHCP servers 32 which use dynamic host configuration protocol to allocate IP address to HNEDs (i.e. DHCP clients) 33.

Usually the DHCP servers 32 and the Network Service Provider server 31 in the network architecture of FIG. 2 can work smoothly. However, for example, when a power failure occurs, and after the power failure recovery, all the HNEDs on the network may send their requests to register with the DHCP server at startup, and thus cause congestion. In such a situation, there will be a lot of HNEDs that fail to connect and register successfully with the server, which causes the IPTV service not being provided properly or at least not fast enough in these devices.

SUMMARY OF THE INVENTION

The invention relates to a system and method for reducing congestion in case of a power shortage or other failure that causes a large number of Home Network End Devices (HNEDs) to send data e.g. at startup.

In an embodiment, a method for assigning network addresses in a communication network which includes a network service provider server, a plurality of servers and a plurality of clients is provided. Servers assign network addresses to the plurality of clients. The method comprises step, at the level of a server, of evenly spreading the network address assignment over the plurality of servers.

In another embodiment, the step of evenly spreading the network address assignment over the plurality of servers comprises associating the plurality of servers with a number of distributed servers, each distributed server storing at least parts of the contents of the network service provider server respectively.

In still another embodiment, each of the plurality of servers is associated with at least one of the distributed servers.

In a further embodiment, at least one of the plurality of servers is associated with a single distributed server.

Advantageously, each of the plurality of servers is associated with the at least one of the distributed servers by turns.

In another embodiment, each of the plurality of servers gives the network address of one of the associated distributed servers to a client when the client requests the contents on the network service provider server.

In another embodiment, each of the plurality of servers uses dynamic host configuration protocol to assign network addresses to the plurality of clients.

In still another embodiment, the step of evenly spreading the network address assignment over the plurality of servers further comprises steps, at the level of a server, of receiving a dynamic host configuration protocol DISCOVER message from a client; and in case of being chosen as the network address provider by the client, stopping responding to DHCPDISCOVER messages broadcasted over the network until a predetermined number of such requests have been fulfilled by other servers.

In a further embodiment, at least parts of the distributed servers are updated according to the network service provider server._

In another aspect, a server for assigning network addresses to a plurality of clients in a communication network is described. The server is associated with at least one memory which stores at least parts of the contents of the network service provider server.

In an embodiment, the memory is in the form of at least one distributed server.

In an embodiment, the server uses dynamic host configuration protocol to assign network addressed to the plurality of clients.

In another embodiment, the server gives the network address of one of the associated distributed servers to a client when the client when the client requests the contents on the network service provider server.

In a further embodiment, the server gives the network addresses of the associated distributed servers by turns to the plurality of clients when there is at least one distributed server being associated with the server.

In still a further embodiment, several servers can be attached to a single distributed server.

In another embodiment, the server and the associated distributed servers can be physically separated or be integrated.

BRIEF DESCRIPTION OF THE DRAWINGS

Other characteristics and advantages of the invention will be apparent through the description of a non-limiting embodiment of the invention, which will be illustrated with the help of the accompanying drawings.

FIG. 1 is an example of the format of a conventional DHCP message;

DETAILED DESCRIPTION OF THE INVENTION

The exemplifications set out herein illustrate preferred embodiments of the invention, and such exemplifications should not be construed as limiting the scope of the invention in any manner.

Figure 2:
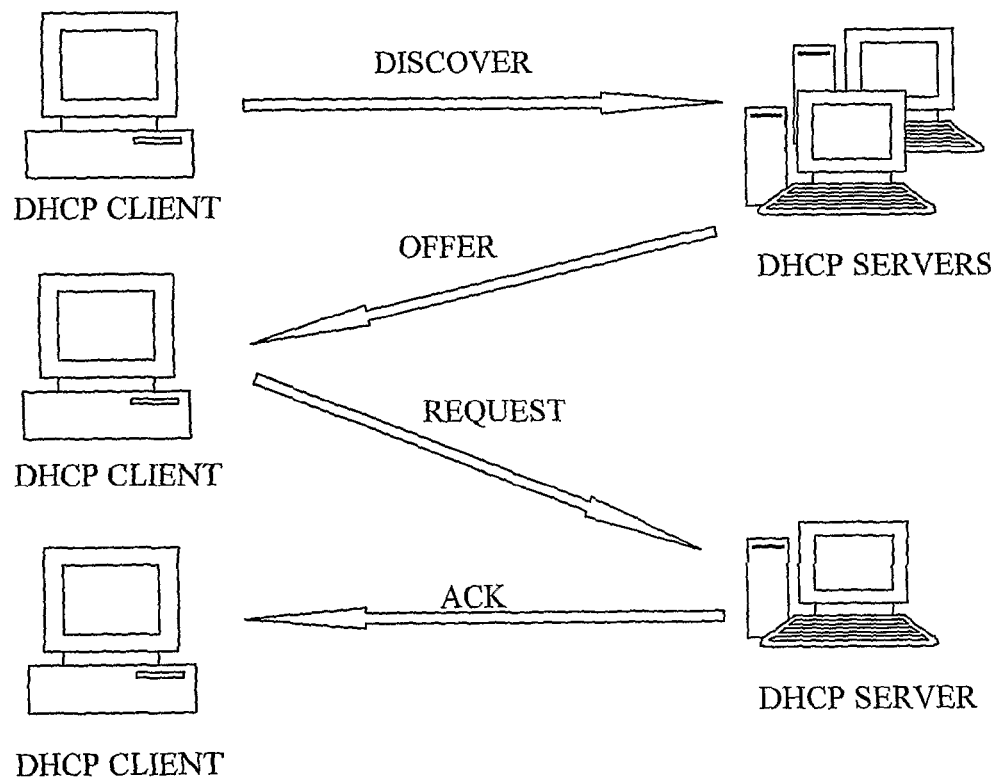
FIG. 2 is a schematic drawing showing how IP address is allocated between DHCP servers and a DHCP client.
Figure 3:
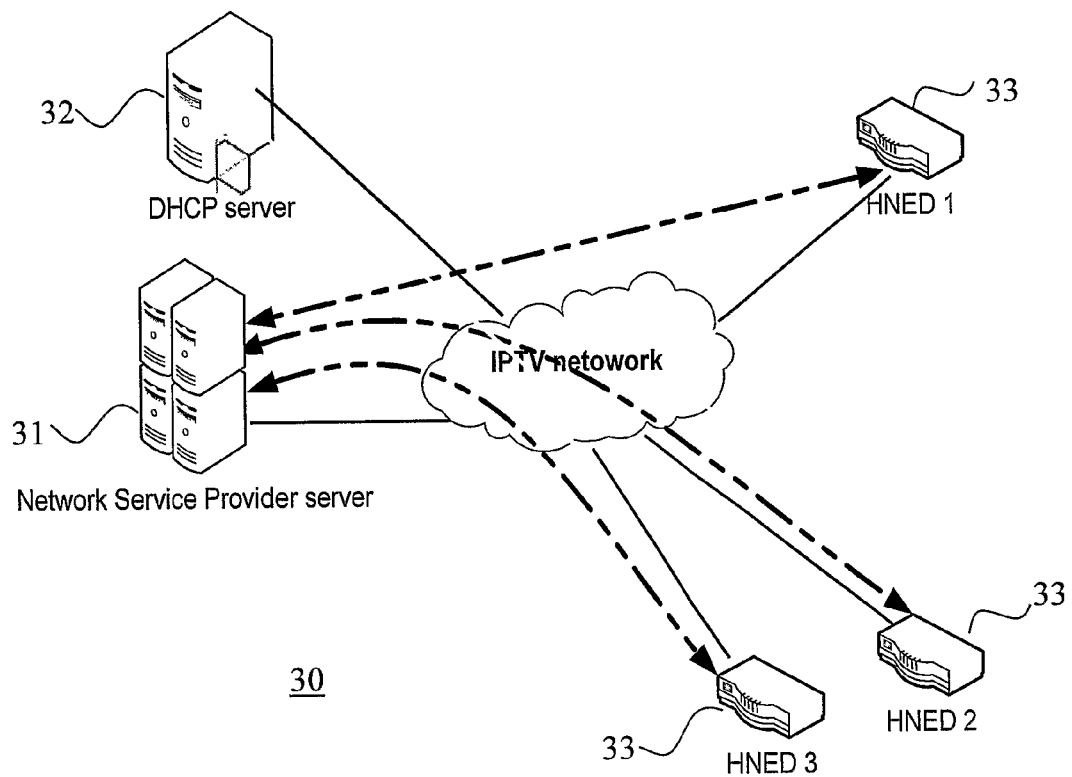
FIG. 3 is the architecture of a conventional IPTV network provisioning system.
Figure 4:
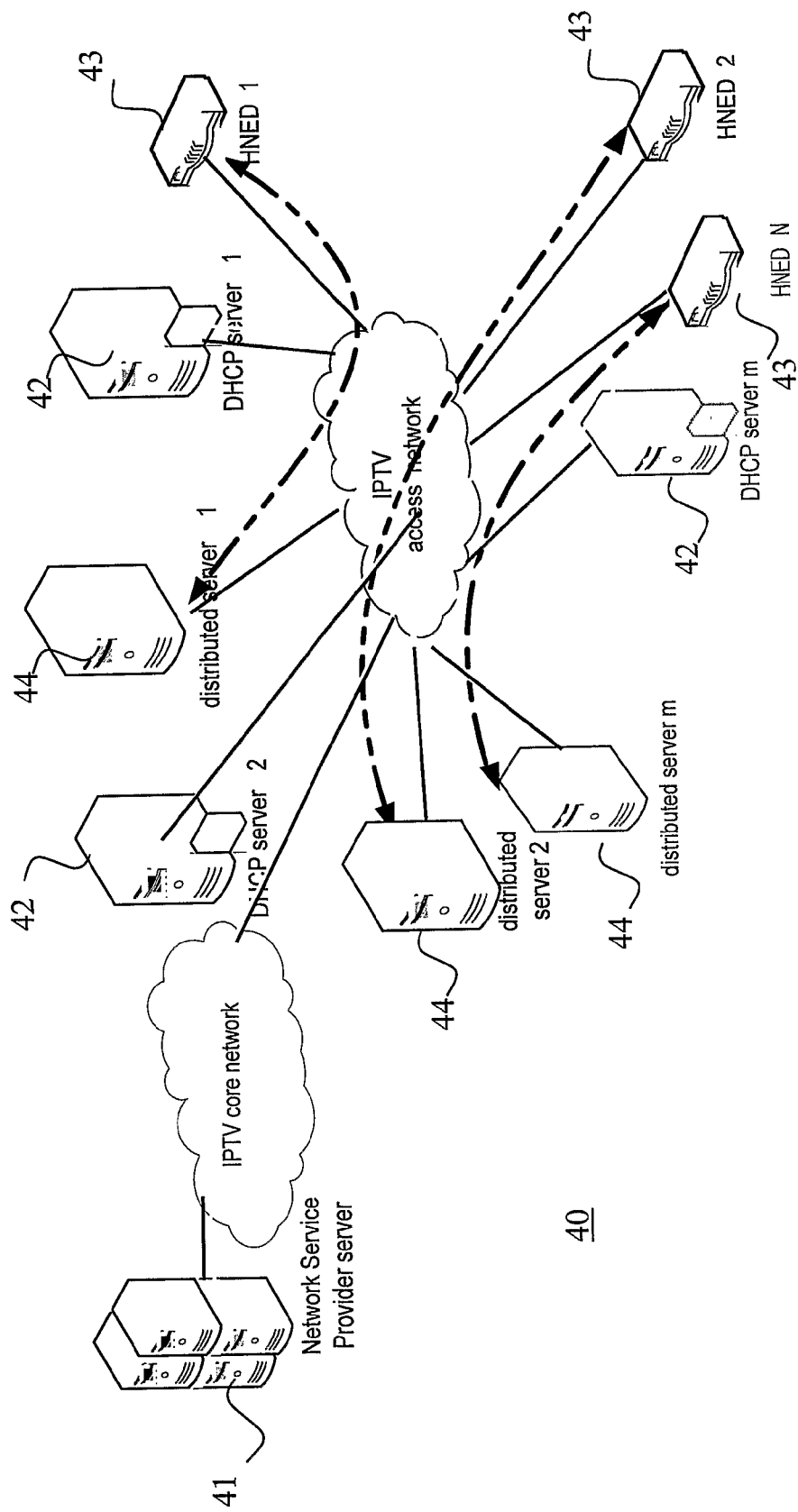
FIG. 4 is the distributed system architecture according to one embodiment.

Referring now to FIG. 4, there is shown an exemplary distributed system architecture 40 according to a preferred embodiment. The distributed system 40 comprises a Network Service Provider server 41, a great number of HNEDs 43, m DHCP servers 42 and m memories 44, with each DHCP server 42 being associated with one memory 44. In a preferable embodiment, the memories can be embodied as distributed servers 44. DHCP server 42 and the associated distributed servers can be physically separated or integrated according to different uses. Each distributed server 44 gets and stores the network contents from the Network Service Provider server 41 and provides the network contents to HNEDs 43. The HNEDs 43 need only communicate with the distributed servers 44 to get the information they want. When there is new information on Network service provider server 41, the Network Service Provider Server 41 will keep part of or all the distributed servers 44 updated according to the implementation needs.

Figure 5:
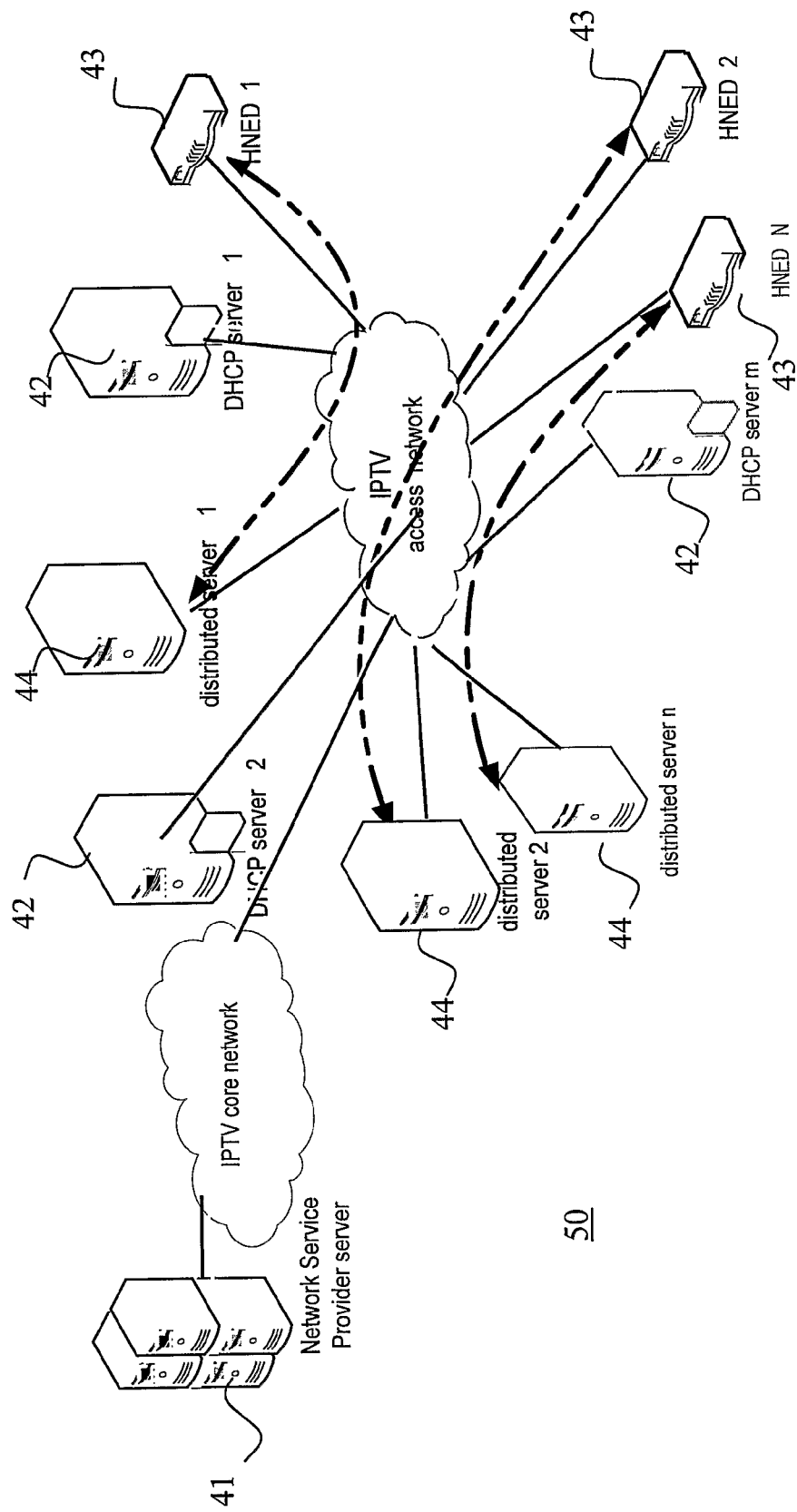
FIG. 5 is the distributed system architecture according to another embodiment.

FIG. 5 shows another distributed system architecture 50, where the number of distributed servers and the number of the DHCP servers are different. There are n distributed servers and m DHCP servers.

Figure 6:
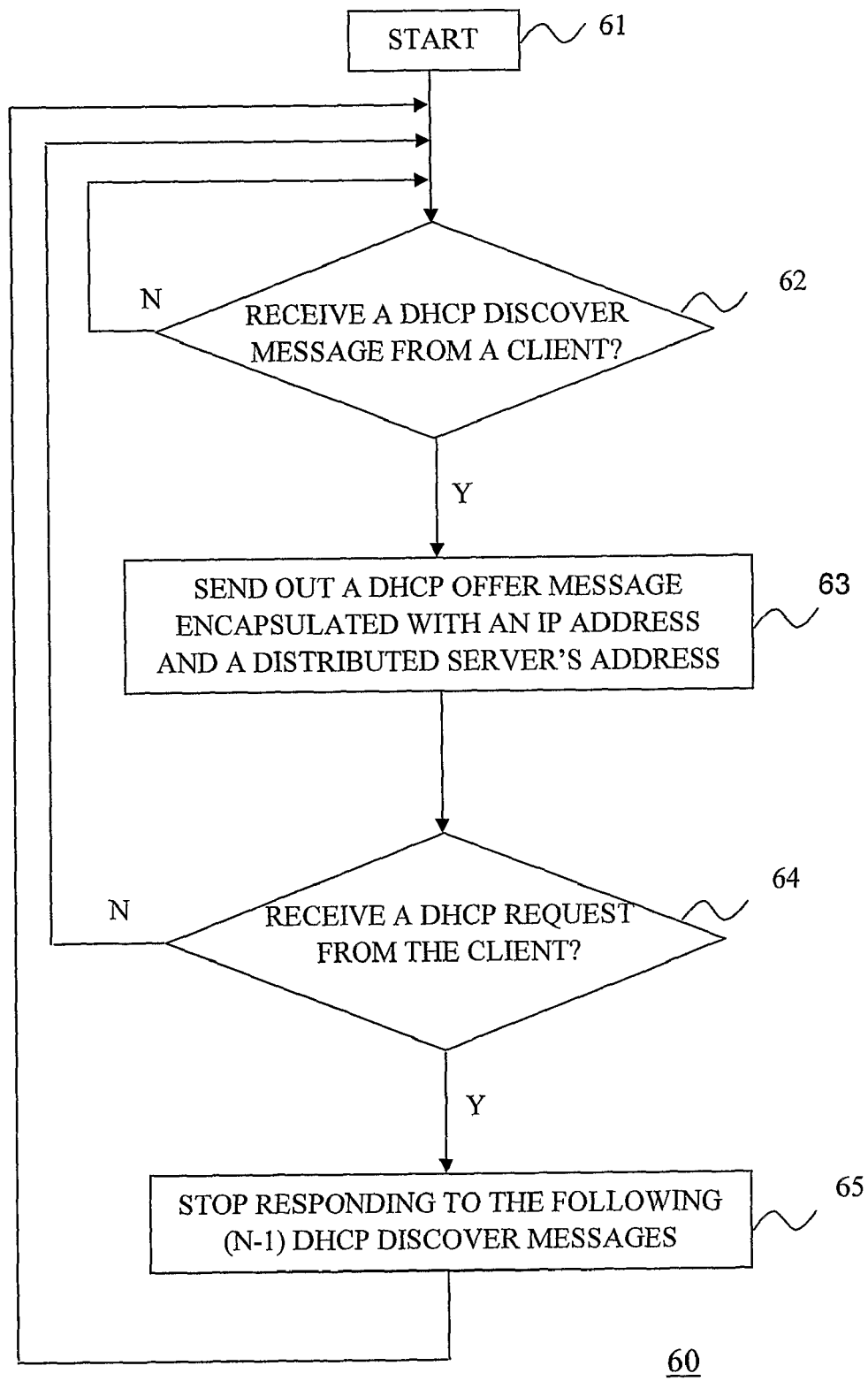
FIG. 6 is a flow chart showing the detailed process at the DHCP servers according to the embodiments of FIG. 4 and FIG. 5.

FIG. 6 is a flow chart 60 showing the detailed process at a DHCP server according to the first preferred embodiment shown in FIG. 4. The DHCP server is provided with the total number of the DHCP servers available in the IPTV network in advance. When the DHCP server's offer is accepted by a client, it will stop responding to DHCPDISCOVER messages until each of the remaining DHCP servers' offer has been accepted by a client. In this embodiment, the total number of the DHCP servers is m.

For the DHCP server, the whole process starts with step 61. At step 62, it is determined whether the DHCP server receives a DHCPDISCOVER message broadcasted by a HNED. If the DHCP server hasn't received any DHCPDISCOVER messages at step 62, i.e. no, it will remain waiting for DHCPDISCOVER messages. If yes, i.e. the DHCP server receives a DHCPDISCOVER message, the DHCP server will send back a DHCPOFFER message with an allocated IP address encapsulated in the "yiaddr" field (see FIG. 1) and the address of the distributed server associated with the DHCP server encapsulated in the "siaddress" field (see FIG. 1) of the DHCP message at step 63.

If the DHCP offer is accepted by a particular client, the client will send a DHCPREQUEST message on the network to indicate the IP address allocated by the DHCP server has been chosen by the client. At step 64, it is determined whether the DHCP server receives the DHCPREQUEST message broadcasted by the client. If yes, i.e. the IP address allocated by the DHCP server has been chosen by a client, at step 65, the DHCP server will send back a DHCPNAK to the client when the allocated IP address can be used or send back a DHCPNAK to the client when the allocated IP address for some reason can't be used, and stop responding to the following (m−1) DHCPDISCOVER messages broadcasted on the network. If no, the DHCP server will receive DHCPDISCOVER messages and responds the messages accordingly.

The DHCP message counting process can be performed by a counter. The counter is initially set to zero. After the DHCP server allocates an IP address to a client, i.e. the DHCP server receives the DHCPREQUEST message from the DHCP client, each time a DHCPDISCOVER message is received by the DHCP server, the counter is increased by one until the counter equals to m−1. When the counter is m−1, the DHCP server restarts to respond to the following DHCPDISCOVER messages and the counter is reset to zero.

In another embodiment, after the DHCP server's offer is accepted by a DHCP client, the DHCP server will stop responding to the following i (i>0 and i≠m−1) DHCPDISCOVER messages broadcasted on the network.

In the above embodiment of FIG. 4, the number of the distributed servers and the number of the DHCP servers are the same. However, they can also be different, such as shown in FIG. 5. For example, there could be more distributed servers than the number of DHCP servers. In such a case, a DHCP server can be associated with several distributed servers. And if the DHCP server receives a DHCPOFFER message, it will encapsulate one of the associated distributed servers' address in the "siaddress" field of the DHCP message by turns at step 63.

In a further embodiment, there could also be more DHCP servers than the number of distributed servers, and a distributed server is associated with several DHCP servers. DHCP clients accepting the offer of these DHCP servers will communicate with the distributed server associated with these DHCP servers.

Advantageously, in the above mentioned embodiment, the HNEDs make requests to the distributed servers instead of the Network Service Provider, and will try to connect with the assigned distributed servers at startup or reset. And thus even in the case of a power shortage or other failures that cause larger number of HNEDs to send data to the Network Service Provider, the traffic will be shared among all the distributed servers instead of overloading the Network Server Provider.

In this way, it is more likely that the HNEDs will successfully establish the connection with the servers during a reasonably limited period.

The invention claimed is:

1. A method for balancing loads of servers in a network which includes a plurality of servers serving a plurality of clients, the method, at the level of a server, comprising:

receiving a first message, a request message, from a client asking for a service;

sending out a second message from a server, a response message, notifying that the server can provide the service to the client; and upon the server receiving a third message from the client showing that the server is chosen as the service provider by the client, the server stops responding to request messages broadcast over the network until a predetermined number of requests are fulfilled by other servers, otherwise responding to request messages that follow;

assigning, by the servers, network addresses to the clients, and spreading the network address assignment over the plurality of servers.

2. The method according to claim 1, wherein the step of spreading network address assignment associates the plurality of servers with a number of distributed servers, each distributed server stores contents from a network service provider server.

3. The method according to claim 2, wherein the network address is included in the response message from the server.

4. The method according to claim 3, wherein between the servers and the clients, the messages are exchanged via Dynamic Host Configuration Protocol.

5. The method according to claim 4, wherein the request message is DHCPDISCOVER message.

6. The method according to claim 5, wherein the response message is DHCPOFFER message.

7. The method according to claim 6, the third message is DHCPREQUEST message.

* * * * *